United States Patent
Heiman et al.

(10) Patent No.: US 7,616,649 B2
(45) Date of Patent: Nov. 10, 2009

(54) TRANSFERRING COMPRESSION PARAMETERS IN A MOBILE COMMUNICATION SYSTEM

(75) Inventors: Mika Heiman, Helsinki (FI); Jyri Turunen, Helsinki (FI)

(73) Assignee: Nokia Siemens Networks Oy, Espoo (FI)

( * ) Notice: Subject to any disclaimer, the term of this patent is extended or adjusted under 35 U.S.C. 154(b) by 608 days.

(21) Appl. No.: 10/898,621

(22) Filed: Jul. 26, 2004

(65) Prior Publication Data

US 2005/0276247 A1 Dec. 15, 2005

(30) Foreign Application Priority Data

Jun. 14, 2004 (FI) .................. 20040817

(51) Int. Cl.
*H04L 12/56* (2006.01)
(52) U.S. Cl. .................. 370/401; 370/402; 370/389; 370/352; 370/372; 370/358; 370/349; 370/356; 370/384; 370/392
(58) Field of Classification Search .................. 370/331, 370/328, 346, 349, 403, 34.1
See application file for complete search history.

(56) References Cited

U.S. PATENT DOCUMENTS 6,104,929 A * 8/2000 Josse et al. .................. 455/445
6,661,782 B1 * 12/2003 Mustajarvi et al. .......... 370/331
6,968,190 B1 * 11/2005 Suumaki et al. ............. 455/436
7,136,395 B2 * 11/2006 Lupien et al. ............... 370/472
7,154,868 B1 * 12/2006 Sharma et al. .............. 370/331
2005/0259690 A1 * 11/2005 Garudadri et al. .......... 370/477

FOREIGN PATENT DOCUMENTS

WO WO 01/39525 A2 5/2001

OTHER PUBLICATIONS

PCT/FI98/00041.*
3GPP TSG GERAN # 19, Tdoc GP-040619, "Inter-SGSN PS Handover and XID Procedures," Cancun, Mexico, Apr. 19-23, 2004, pp. 1-7.

* cited by examiner

*Primary Examiner*—Charles N Appiah
*Assistant Examiner*—Randy Peaches
(74) *Attorney, Agent, or Firm*—Squire, Sanders & Dempsey L.L.P.

(57) ABSTRACT

The invention relates to a method for transmitting compression parameters in a mobile communication system, comprising a mobile node, a first and a second packet switching node. In the method the second packet switching node is informed of the entry of the mobile node to an area controlled by the second packet switching node. At least one compression parameter is received from the first packet switching node to the second packet switching node. The second packet switching node informs at least one of the at least one compression parameter to the mobile node by way of layer-3 parameter renegotiation for a logical link connection. The benefits of the invention are related to improved reliability of packet data transmission to and from a mobile node.

20 Claims, 6 Drawing Sheets

TRANSFERRING COMPRESSION PARAMETERS IN A MOBILE COMMUNICATION SYSTEM

BACKGROUND OF THE INVENTION

1. Field of the Invention

The invention relates to mobile communication systems. Particularly, the invention relates to the transfer of packet header and data compression parameters in a mobile communication system.

2. Description of the Related Art

A disadvantage associated with wireless data transmission is that the data transfer rate is limited compared to wire-line data transmission. Especially, the data transfer rate is limited in cellular mobile communication systems where a given frequency band must be shared by a number of simultaneous users. When transferring packet data in a cellular mobile communication system, the data transfer rate made available for application layer data transmission is further reduced due to frame and packet headers. For example, when the Transmission Control Protocol (TCP) is carried over the Internet Protocol (IP) version 4, the total header size is 40 bytes of which TCP layer headers take 20 bytes and IP layer headers 20 bytes. In IPv6 the IP layer header size is 40 bytes. The problem is made worse in the cases where IP-in-IP tunneling is used, for example, in association with the Mobile IP.

In order to alleviate the aforementioned problems associated with wireless and in general slow links payload data and header compression schemes have been introduced. Examples of such header compression schemes are Van Jacobson header compression defined in the Internet Engineering Task Force (IETF) Request For Comments (RFC 1144) and Degermark header compression defined in the IETF RFC 2507. An example of a payload data compression scheme is V.42bis by International Telecommunications Union (ITU-T).

Generally, header compressions rely on the fact that a large part of the headers contain information, which remains constant during the course of a typical TCP/IP connection. Similarly, when Universal Datagram Protocol (UDP) is carried over IP, a significant part of the packet headers remain constant in any given flow, which carries, for example, streaming multimedia. An IP header comprises a number of fields. As a sequence of IP packets is transmitted, there is no need to repeatedly transmit the fields that are not changed between subsequent packets. Those fields that usually change with small or predictable values, for example, TCP sequence numbers in TCP headers, may be encoded incrementally so that the number of bits needed for transmitting the value of those fields decreases significantly. Only those fields that change often and randomly, for example, checksums or authentication data, need to be transmitted in entirety in each header. In header compression is sent occasionally a packet with a full header, which establishes a context. Thereupon, in subsequent packets compressed headers refer to the established context and may contain incremental changes to the context. In order for the header compression to work, it is necessary that a sender and a receive maintain the same context. A number of different contexts may be maintained in the sender and the receiver side to support different packet streams carried over same link, that is, for example, TCP/IP connections or UDP packet flows.

Payload data compression relies, on the other hand, upon the redundancy of data to be carried in packet payload. For example, there may be repeating strings in packets. The compression is achieved by maintaining by at the sender and at the receiver side code dictionaries than comprise information on strings comprised in the uncompressed data. The code dictionaries enable the sender to refer to codes instead of entire strings while the transmission occurs in the compressed mode. The V.42bis compression relies on the Lempel-Ziv-Welch algorithm. More information on the Lempel-Ziv-Welch algorithm can be found, for example, in U.S. Pat. Nos. 4,955,066, 4,701,745 and 5,016,009.

In association with mobile communication systems the use of header compression and payload data compression has been standardized, for example, in the General Packet Radio System (GPRS). Header compression and payload data compression is used between a mobile station and a Serving GPRS Support Node (SGSN) in order to decrease the amount of data to be transmitted over the air interface between the mobile station and a base transceiver station.

Reference is now made to FIG. 1, which is a block diagram illustrating the architecture and the protocol stacks in a GPRS system in association with the GSM Edge Radio Access Network (GERAN). The GPRS system is specified, for example, in the 3G Partnership Project (3GPP) specification 23.060. The protocol stacks are illustrated from the user plane point of view. In FIG. 1 there is a Gateway GPRS Support Node (GGSN) 106. GGSN 106 is connected to an external network (not shown) via a Gi-interface. The external network may be an arbitrary IP network, for example, the Internet or an intranet. In FIG. 1 there is also a Serving GPRS Support Node (SGSN) 104. GGSN 106 communicates with SGSN 104, which routes packets to and from Mobile Station (MS) 100 via a Base Station Subsystem (BSS). SGSN 104 takes care of the mobility related tasks such as the maintaining of mobile station 100 location information, network registrations, routing area and location updating, Packet Data Context (PDP) activation and deactivation, handovers and the paging of mobile station 100. Part of the above mentioned tasks are naturally done in other network elements with which SGSN 104 is communicating. The GGSN is responsible for routing and tunneling packets to and from a number of SGSN 104 and other SGSNs. The routing is based on SGSN address information maintained in a Packet Data Protocol (PDP) context held by GGSN 106. There is at least one PDP context for each network address activated for MS 100, for example, an IP address or an X.25 address or a PPP link.

In FIG. 1, the uppermost protocol layer in MS 100 is the application layer (APPL). The application layer may be any protocol, for example, a protocol from the Wireless Application Protocol (WAP) standard or the Transmission Control Protocol (TCP) or the Universal Datagram Protocol (UDP). Over the TCP/IP may be carried, for example, Hypertext Transfer Protocol (HTTP). The application layer communication is exchanged with a peer host, which may be located behind the Gi-interface, for example, in the Internet. Below the application layer there is the IP layer or alternatively X.25 layer, which in GPRS is supported by both MS 100 and GGSN 106. The IP address for packets addressed to MS 100 points to GGSN 106. An IP packet 114 is conveyed to MS 100 using GPRS user plane protocols below the IP layer. Between GGSN 106 and SGSN 104 IP packet 114 is conveyed using the GPRS Tunneling Protocol (GTP). A GTP packet carried further over UDP/IP.

In SGSN 104 IP packet 114 data is routed based on MS 100 location information and passed to Sub-Network Dependent Convergence Protocol (SNDCP) layer. SNDCP is specified in the 3GPP specification 44.065. SNDCP layer maps network-level characteristics onto the characteristics of the underlying network. For example, SNDCP takes care of the transmission and reception of Network layer Protocol Data Units (N-PDU)

carrying IP packets. For example, IP packet 114 is carried in N-PDU 112. SNDCP multiplexes several packet data protocol packets for the same MS. It segments IP packet 114 to LLC frames, for example, LLC frame 110. It also reassembles packets from LLC frames. Header compression and data compression is also performed at SNDCP layer. The header compression scheme mentioned in the 3GPP specification 23.060 includes TCP/IP header compression. V.42bis is mentioned as a method for data compression. At the SNDCP layer there are a number of compression entities (not shown) each of which have associated with them an algorithm and the entity specific parameters. Each SNDCP entity, which supports protocol control information compression, is able to negotiate at least one protocol control information compression entity using XID parameter negotiation as specified in the 3GPP specification 44.064. The initiating SNDCP entity defines a set of requested compression entities, together with the algorithm and parameters for each compression entity. The set of compression entities and their algorithms and parameters are transmitted to the peer SNDCP entity. The peer SNDCP entity responds with the set of negotiated compression entities and their algorithms and parameters. The peer SNDCP entity selects the proposed parameter values or other appropriate values for the negotiated compression entities. The information on the set of compression entities used and their algorithms and parameters is referred to hereinafter as the SNDCP compression parameters. Other compression information held at the SNDCP layer comprise, for example, at least one header compression context and at least one code dictionary. SNDCP performs parameter negotiation between MS 100 and SGSN 104. SNDCP also buffers N-PDUs in the case of acknowledged mode services.

The Logical Link Control (LLC) layer provides a highly reliable link between MS 100 and SGSN 104. The LLC is specified in 3GPP specifications 44.064 and 04.64. The LLC is independent of the underlying radio protocols and hides the BSS and radio interface related tasks from the LLC layer users. LLC supports variable-length information frames. LLC supports both acknowledged and unacknowledged data transfers, that is, acknowledged and unacknowledged modes of operation. LLC provides services typical to a link layer comprising parameter negotiation, flow control in the Asynchronous Balanced Mode (ABM), sequence control to maintain the ordering of LLC-frames, expedited delivery for high-priority data, error detection, error recovery and indication. LLC performs data confidentiality by means of the ciphering of LLC-frame contents. LLC also supports user identity confidentiality by means of the use of Temporary Logical Link Identity (TLLI) instead of International Mobile Subscriber Identity (IMSI). A Service Access Point Identifier (SAPI) identifies a point, at which LLC services are provided by a Logical Link Entity (LLE), in other words an LLC entity, to a layer-3 entity. Consequently, SAPI identifies an LLE that should process an LLC frame and also a layer-3 entity that is to receive information carried by the LLC frame. The layer-3 entity is, for example, an SNDCP entity.

The relay layer relays LLC PDUs between the Um and Gb interfaces in the BSS. The Base Station System GPRS Protocol (BSSGP) layer specified in 3GPP specification 08.18 conveys routing and QoS-related information between the BSS and the SGSN. For example, it carries radio resource related requests from the SGSN to the BSS 102. It also carries LLC frames between the BSS and the SGSN. In addition to LLC frames it also carries signaling PDUs associated with GRPS mobility management. The Network Service (NS) layer transports BSSGP PDUs between BSS and SGSN. NS may be based on Frame Relay (FR). The RLC sub-layer within the RLC/MAC layer provides a radio technology dependent reliable link between MS 100 and BSS 102. The MAC sub-layer performs the requesting and reservation of radio resources and maps LLC frames onto the GSM physical channels. The task of the MAC layer is to ensure efficient sharing of common radio resources by several mobile stations. The RLC/MAC layer is defined in the 3GPP specification GSM 04.60.

Reference is now made to FIG. 2, which is a block diagram illustrating packet transmission before and after a routing area update in a prior art GPRS network. In FIG. 2 there is an MS 100, Base Transceiver Stations (BTS) 224-228 and Base Controller Stations (BSC) 210-214 in BSS 216. There is a GGSN 200, which is connected to IP network 201. From IP network 201 is received a downlink packet stream 240. Initially, downlink packet flow 240 is tunneled from GGSN 200 to SGSN 202 as packet stream 241. Initially, SGSN 202 routes packets from packet stream 241 to MS 100 via BSC 212 and BTS 222 as packet stream 242. Packet stream 242 is carried from an SNDCP entity 252 in SGSN 202 to SNDCP entity 230 in MS 100 using an LLC connection serving both SNDCP entities. BSC 212 and BTS 222 are referred to as source BSS 262. MS 100 communicates with BSC 212 via BTS 222. In routing area update related signaling SGSN 202 communicates with MS 100 via BSC 212 and a BTS 222 within BSS 262.

When MS 100 detects that a new cell has better radio quality, it must start camping on the new cell, which is served by BTS 224. The new cell is in the area of a new SGSN 204. After the handover, packet stream 240 should be routed to MS 100 from GGSN 200 via SGSN 204, BSC 214 and BTS 224. BSC 214 and BTS 224 are also referred to as a target BSS 264. While the PDP contexts have not yet been updated in GGSN 200, SGSN 202 must forward any unacknowledged packets to SGSN 204. The packets are sent from SGSN 202 as packet stream 243. After GGSN 200 has received a PDP context update request and processed it, it may start sending packets from packet stream 240 directly to SGSN 204 as packet stream 244. SGSN 204 sends packets from packet streams 243 and 244 to MS 100 as packet stream 245. Packet stream 245 is carried from an SNDCP entity 254 in SGSN 204 to SNDCP entity 230 in MS 100 using an LLC connection serving both SNDCP entities. Before packets may be sent from SGSN 204 to MS 100 after the detection of a routing area update, an XID reset procedure must be performed between SNDCP entities 254 and 230. Otherwise, the LLC parameters will not match in the MS 100 and SGSN 254 and all LLC frames will be rejected.

Reference is now made to FIG. 3, which is a signaling diagram depicting routing area update signaling in a prior art GPRS network such as illustrated in FIG. 2. At time $t_1$ an MS 100 detects an event that indicates that it must start using a new cell (not shown). The new cell is within a new routing area, which is controlled by a new SGSN 204. MS 100 sends a Routing Area Update Request message to SGSN 204 as illustrated with arrow 301. The message is sent via a target BSS 264, which controls the new cell. SGSN 204 sends an SGSN Context Request message illustrated with arrow 302 to an old SGSN 202 to get the mobility management and PDP contexts for MS 100. The SGSN Context Request message comprises, for example, an old routing area identifier, a Temporary Logical Link Identity (TLLI) and the new SGSN address. SGSN 202 responds with message SGSN Context Response illustrated with arrow 303. The SGSN Context Response message provides the mobility management context and at least one PDP context associated with MS 100. After receiving the SGSN Content response message SGSN 204 may initiate an XID reset procedure. XID-reset procedure comprises that an SNDCP entity 254 in SGSN 204 requests an LLC-entity in SGSN 204 to send an XID command message to MS 100 as illustrated with arrow 304. In the case of XID reset, the XID Command message includes a Reset parameter, which tells the peer LLC entity to reset the LLC parameters. MS 100 acknowledges the XID Command with the XID Response message as illustrated with arrow 305.

As defined in 3GPP specification 44.064 several actions take place at the XID procedure if a Reset parameter is detected in an XIID Command message. All requests pending from layer 3 to the LLC entities in SGSN 204 and MS 100 are discarded without any further action. Any ongoing Asynchronous Balanced Mode (ABM) establishment, release and XID negotiation procedures are aborted, except the XID negotiation pertaining to a Reset parameter. The LLC layer parameters are set to the default values. Any Logical Layer Entities (LLE) in ABM state is changed to Asynchronous Disconnected Mode (ADM) state. Unconfirmed state variables V(U) and V(UR) are set to 0. Further, all Overflow Counters (OC) for unacknowledged information transfer are set to 0.

After having received the SGSN 204 address, SGSN 202 may start forwarding packets to it as illustrated with arrow 306. SGSN 204 must update PDP contexts in the GGSNs that have PDP contexts active for MS 100. The updating of PDP contexts specifies, for example, the new SGSN address for the GGSNs. SGSN 204 sends the Update PDP Context Request message to GGSN 200 and receives Update PDP Context Response message as acknowledgement, as illustrated with arrows 307 and 308, respectively. The routing area update is acknowledged with Routing Area Update Accept message sent by SGSN 204 to MS 100, which responds by sending Routing Area Update Complete message to SGSN 204, as illustrated with arrows 309 and 310.

The ABM release that is performed in association with the processing of XID Reset parameter specified in the XID Command message causes significant problems in prior art. After the XID reset the ABM mode must be re-established with Set Asynchronous Balanced Model (SABM) negotiation sent to MS 100. This is illustrated using arrow 310. The Unnumbered Acknowledgement (UA) response to the ABM mode re-establishment from MS 100 is illustrated with arrow 311.

However, without knowledge of the previously used SNDCP parameters there is no possibility to re-establish the ABM mode with the SNDCP parameters that were used by the old SGSN, namely SGSN 202, to communicate with MS 100. There are three problems related to this. Firstly, if SGSN 204 does not propose any compression entities, in other words, header or data compression entities, in the SNDCP compression parameters negotiated after XID reset procedure, there is no guarantee that the MS 100 will stop using the previously used SNDCP compression parameters. Secondly, if SGSN 204 proposes any compression entities there is no guarantee that MS 100 is capable of changing them. Thirdly, if SGSN 204 in fact proposes a header compression entity, there remains the question as to whether RFC 1144 or RFC 2507 header compression should be used by default. Some mobile stations do not work properly in the first case and some do not work properly in the second and third cases.

SUMMARY OF THE INVENTION

The invention relates to a method of transmitting compression parameters in a mobile communication network, comprising a mobile node, a first and a second packet switching node. In the method the second packet switching node is informed of the entry of the mobile node to an area controlled by the second packet switching node; at least one compression parameter is received from the first packet switching node to the second packet switching node; the second packet switching node informs at least one of the at least one compression parameter to the mobile node by way of layer-3 parameter renegotiation for a logical link connection.

The invention relates also to a system, which comprises: a mobile node configured to inform a second packet switching node of the entry of the mobile node to an area controlled by the second packet switching node; a first packet switching node; and wherein the second packet switching node is configured to receive at least one compression parameter from the first packet switching node, to inform at least one of the at least one compression parameter to the mobile node by way of layer-3 parameter renegotiation for a logical link connection.

The invention relates also to a packet switching node, which comprises: a user plane protocol entity configured to negotiate compression parameters with a mobile node, to provide at least one compression parameter to a signaling plane protocol entity; and a signaling plane protocol entity configured to receive an indication of a the mobile node entering a new area, to request compression information from the user plane protocol entity, to receive in response the at least one compression parameter from the user plane protocol entity, and to transmit the at least one compression parameter to a second packet switching node.

The invention relates also to a packet switching node, which comprises: a user plane protocol entity configured to inform at least one of at least one compression parameter to a mobile node by way of layer-3 parameter renegotiation for a logical link connection; and a signaling plane protocol entity configured to receive an indication of the mobile node entering an area controlled by the packet switching node, to request information on the mobile node from a second packet switching node, and to receive in response at least the at least one compression parameter.

The invention relates also to a computer program comprising code adapted to perform the following steps when executed on a data-processing system: receiving information of the entry of a mobile node to an area controlled by the second packet switching node; receiving at least one compression parameter from a first packet switching node; and informing at least one of the at least one compression parameter to the mobile node by way of layer-3 parameter renegotiation for a logical link connection.

In one embodiment of the invention the layer-3 comprises Sub-Network Dependent Convergence Protocol (SNDCP) layer and the layer-3 parameters comprise the Sub-Network Dependent Convergence Protocol (SNDCP) parameters.

In one embodiment of the invention, the mobile node comprises a mobile terminal, for example, a UMTS terminal, a GSM terminal, a GPRS terminal, a WLAN terminal or a terminal within an arbitrary cellular radio system. In other words, the mobile node may be a Mobile Station (MS) in a mobile communication system.

In one embodiment of the invention, the mobile node comprises a mobile computer, for example, a laptop computer, palmtop computer or a personal digital assistant (PDA). The mobile computer may be equipped with a data card, which provides the mobile station functionality required in order to operate the mobile computer in a mobile communication system.

In one embodiment of the invention, the mobile communication system comprises a General Packet Radio Service (GPRS), the first and second packet switching nodes comprises Serving GPRS Support Nodes (SGSN) and the logical link connection is GPRS Logical Link Control (LLC) connection. In one embodiment of the invention, the layer-3 parameter renegotiation comprises eXchange Identification (XID) negotiation, in other words, the layer-3 parameter renegotiation is performed using XID negotiation. In one embodiment of the invention second packet switching node informs at least one of the at least one compression parameter to the mobile node during eXchange Identification (XID) negotiation procedure or Asynchronous Balanced Mode (ABM) establishment procedure. XID negotiation is performed, for example, in GPRS LLC protocol.

In one embodiment of the invention, the area controlled by the second packet switching node is a Routing Area (RA), which belongs to the second packet switching node.

In one embodiment of the invention, the mobile node detects its entry to a cell belonging to a new area. The area is, for example, a routing area. Thereupon, the mobile node informs a base station subsystem of its entry to the new routing area. The base station subsystem informs the second packet switching node of the fact that the mobile node has entered a routing area controlled by the second packet switching node. When receiving a routing area update message from the base station subsystem, the second packet switching node requests information on the mobile node from the first packet switching node.

In one embodiment of the invention, sending a routing area update message from the mobile node to the second packet switching node performs the informing of the second packet switching node of the entry of the mobile node to an area controlled by the second packet switching node. In other words, as the mobile node enters an area, for example, a routing area controlled by the second packet switching node, it sends a routing area update message to the second packet switching node. Thereupon, the second packet switching node is aware that the mobile node is within an area controlled by it.

In one embodiment of the invention, the at least one compression parameter comprise in-formation on compression entities, algorithms used by the compression entities and state information associated with the compression entities.

In one embodiment of the invention, sending a handover preparation request message from the first packet switching node to the second packet switching node performs the informing of the second packet switching node of the entry of the mobile node to an area controlled by the second packet switching node.

In one embodiment of the invention, the informing of at least one of the at least one compression parameter to the mobile node is performed during exchange identification negotiation.

In one embodiment of the invention, the user plane protocol entity comprises a Sub-Network Dependent Convergence Protocol (SNDCP) layer entity. The signaling plane protocol entity comprises a GPRS Tunneling Protocol (GTP) entity or an application entity communicating with a GTP protocol entity. The protocol entities may be implemented, for example, as a software module, program block or thread. The exchange of information between the protocol entities is configured to be performed, for example, using inter process communication mechanisms such as message passing or shared memory buffers.

In one embodiment of the invention, the second packet switching node is a Base Station Subsystem (BSS) node, for example, a base station controller or a base station. In one embodiment of the invention, the first or the second packet switching node is a node, which performs the forwarding and switching of data packets at link layer. The invention is not restricted to packet switching nodes that switch packets at network layer level in the manner of e.g. IP routers. By packets are meant herein throughout this disclosure data packets pertaining to any protocol layer, for example, network layer packets, link layer frames, Asynchronous Transfer Mode (ATM) cells.

In one embodiment of the invention, the at least one compression parameter is received from the first packet switching node to the second packet switching node when the first packet switching node requests handover preparation from the second packet switching node. This means that the at least one compression parameter is sent from the first packet switching to the second packet switching node in the message that requests handover preparation.

In one embodiment of the invention, the sending of logical link layer frames or any other messages between the mobile node and the packet switching nodes is performed via a radio access network so that the frames and messages are forwarded by one or many intermediate network elements such as base station controllers, radio network controllers and base transceiver stations. In one embodiment of the invention, the first and the second packet switching nodes are directly connected to base transceiver stations and manage the radio network control procedures directly.

In one embodiment of the invention, the computer program is stored on a computer readable medium. The computer readable medium may be a removable memory card, magnetic disk, optical disk or magnetic tape.

The benefits of the invention are associated with improved reliability of data transmission to and from a mobile node. With the invention it is now possible to provide a uninterrupted packet data connection to a mobile node even as the mobile node changes from an area controlled by a first packet switching node to an area controlled by a second packet switching node. The packet data connection is no longer terminated, if the second packet switching node proposes other compression parameters than previously used.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE EMBODIMENTS

Reference will now be made in detail to the embodiments of the present invention, examples of which are illustrated in the accompanying drawings.

Figure 1:
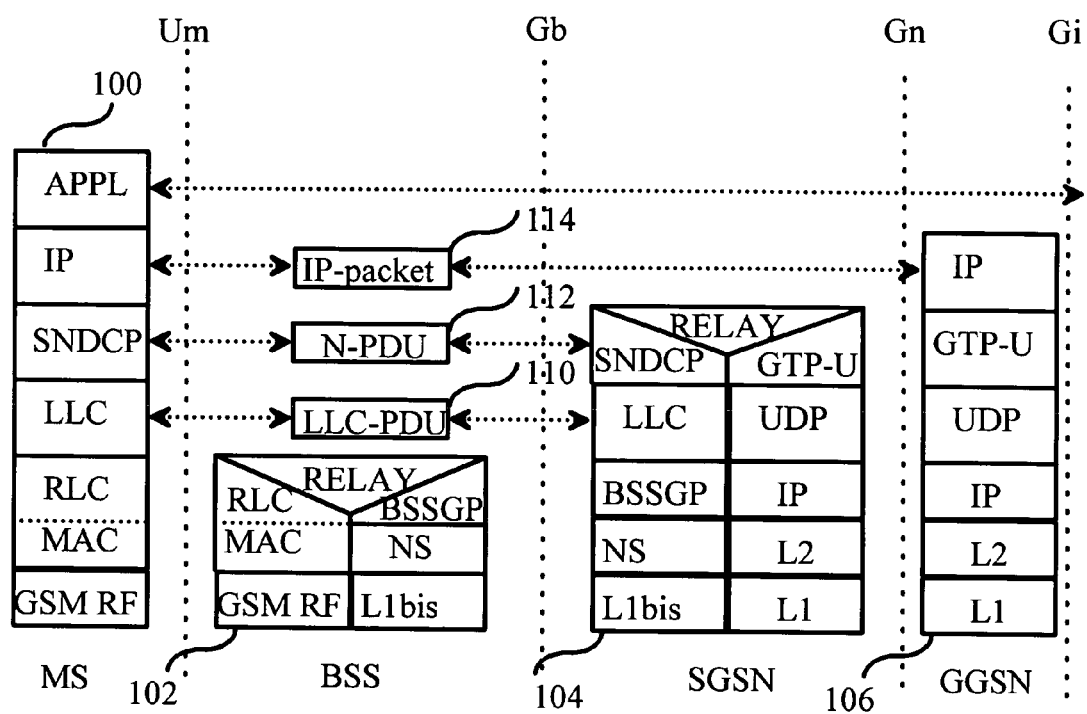
FIG. 1 is a block diagram illustrating the architecture and the protocol stacks in General Packet Radio System (GPRS) in association with the GSM/Edge Radio Network (GERAN)
Figure 2:
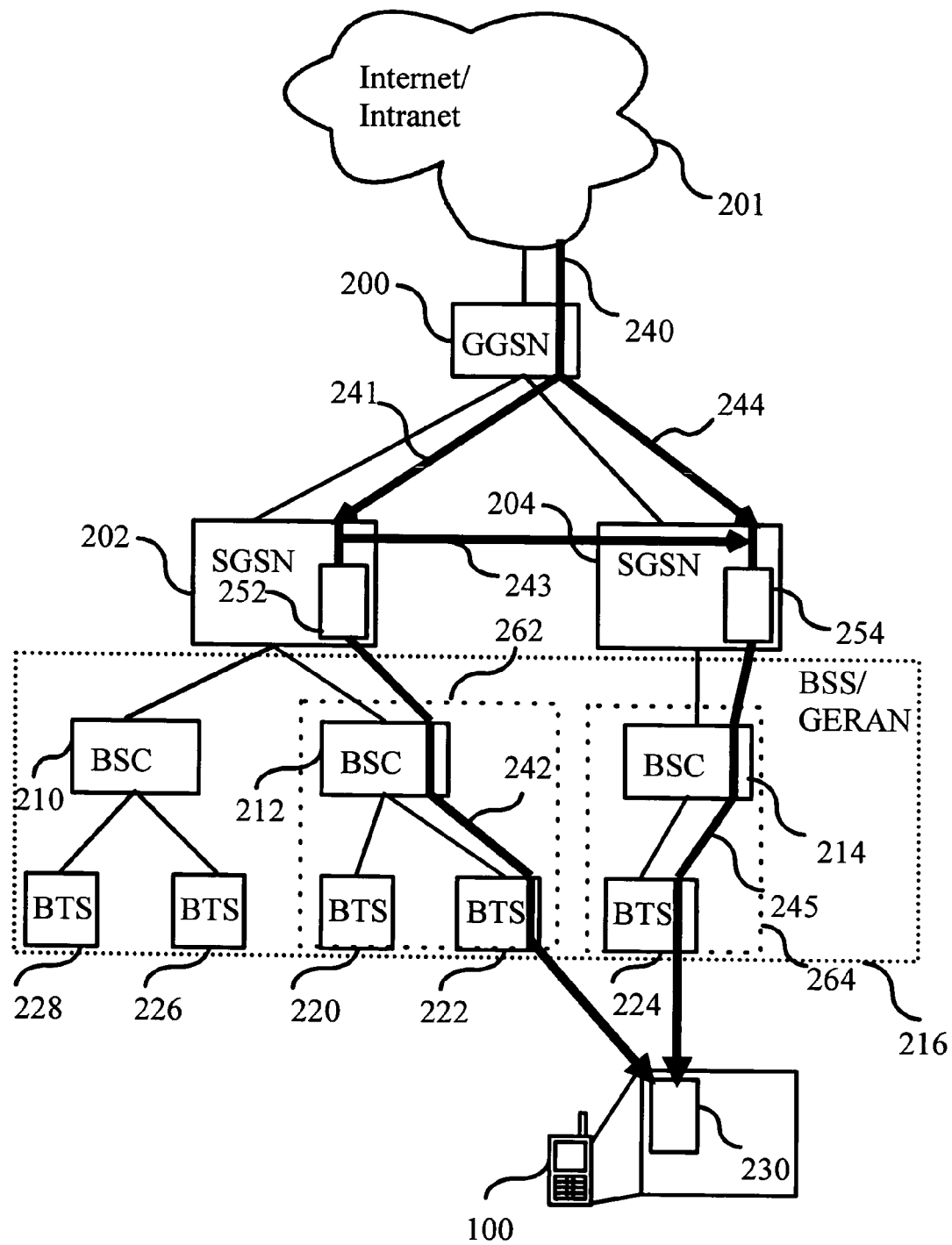
FIG. 2 is a block diagram illustrating packet transmission before and after a routing area update in a prior art General Packet Radio Service (GPRS) network.
Figure 3:
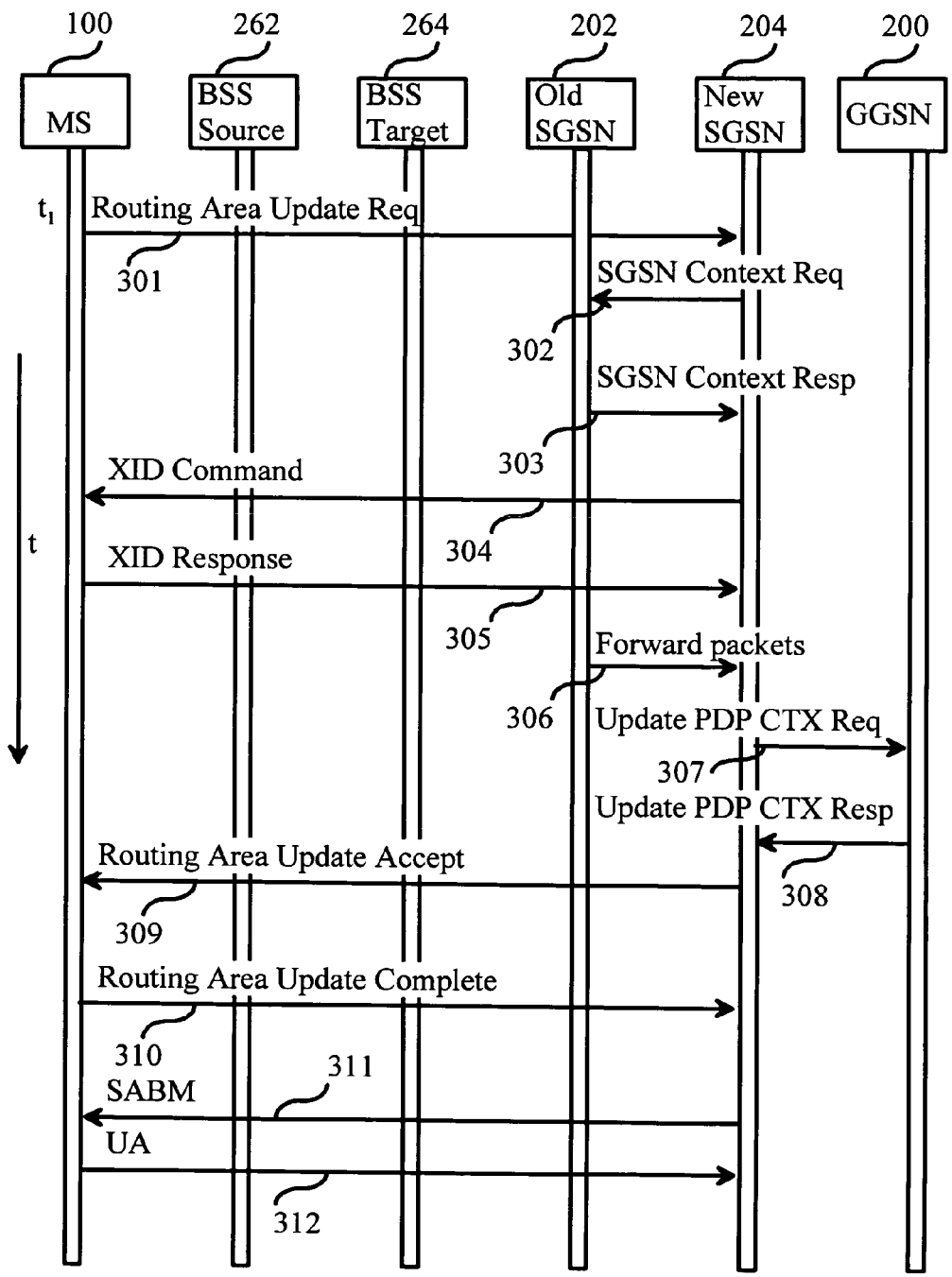
FIG. 3 is a signaling diagram depicting routing area update signaling in a prior art GPRS network.
Figure 4:
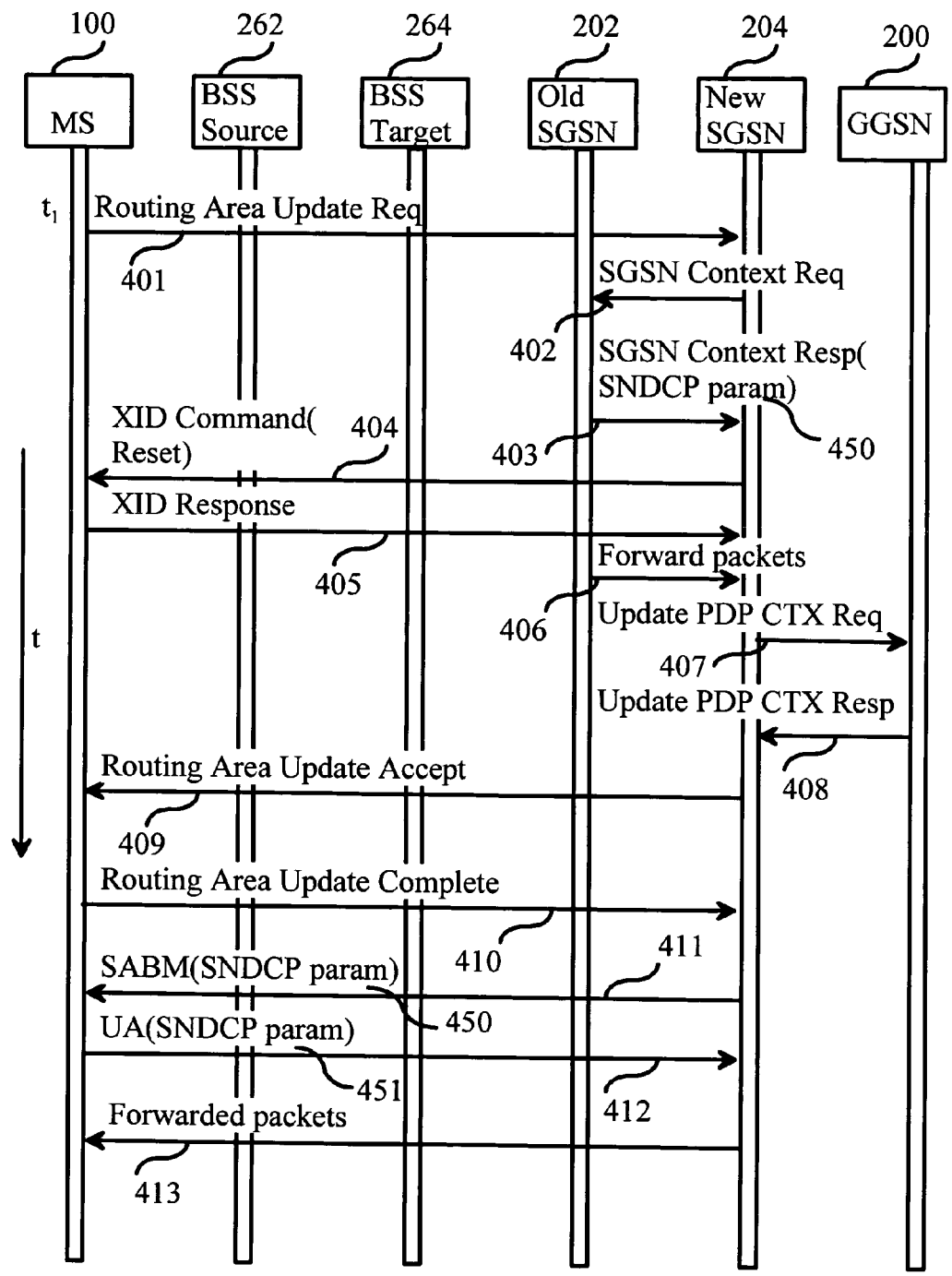
FIG. 4 is a signaling diagram illustrating routing area update signaling, according to the invention.
Figure 5:
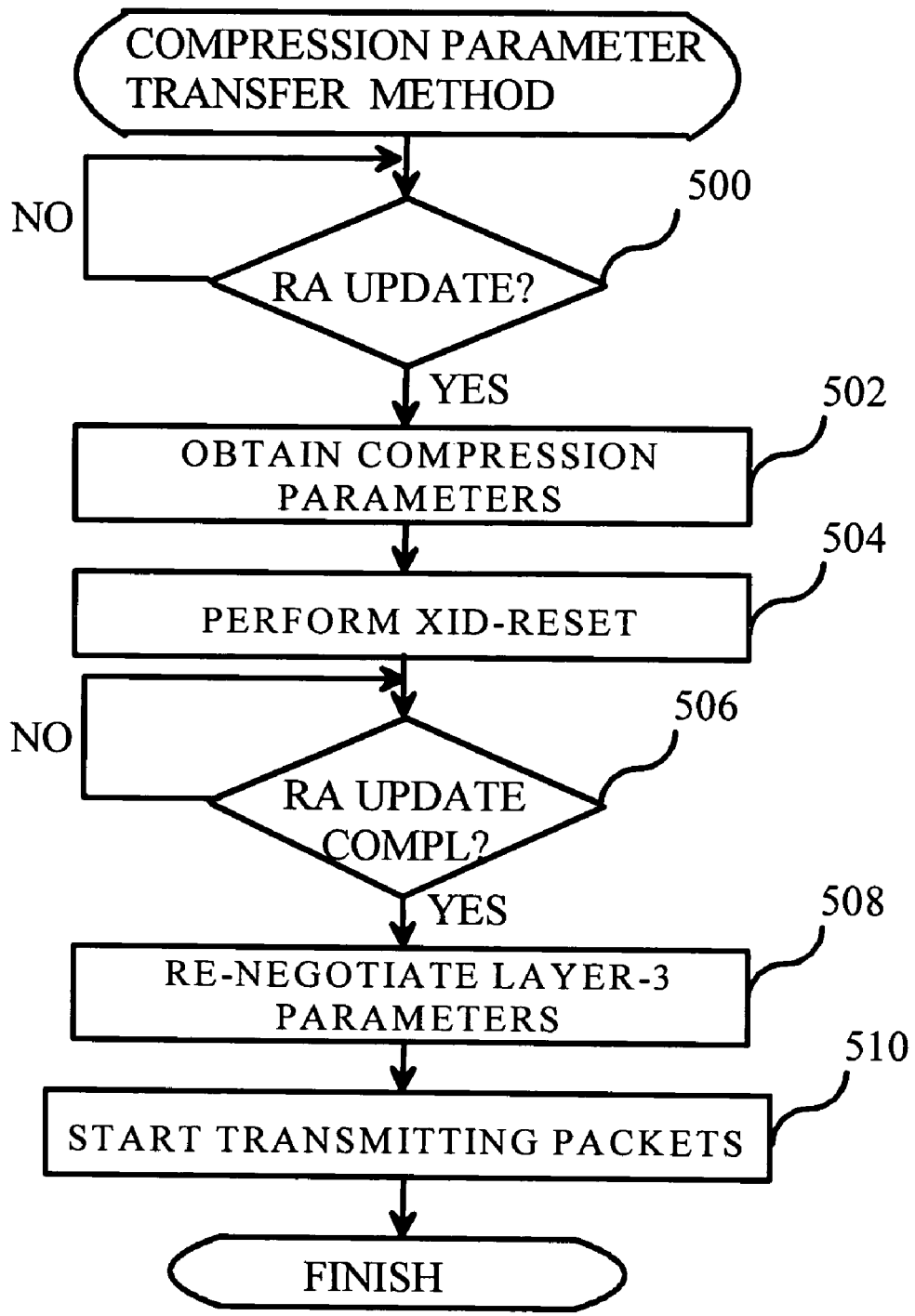
FIG. 5 is a flow chart depicting one embodiment of a method for compression parameter transfer, according to the invention.

FIG. 5 is a flow chart depicting one embodiment of a method for compression parameter transfer, which utilizes a routing area update signaling as illustrated in FIG. 4. The signaling is performed in the GPRS system architecture, which is illustrated in FIGS. 1 and 2. At step 500 a MS 100 waits for Routing Area (RA) update condition. RA update condition is fulfilled as MS 100 detects an event that indicates that it must start using a new cell (not shown). The new cell is within a new routing area, which is controlled by a new SGSN 204. MS 100 sends a Routing Area Update Request message to SGSN 204 as illustrated with arrow 401. Thereupon, the method continues at step 502.

At step 502 SGSN 204 sends an SGSN Context Request message illustrated with arrow 402 to SGSN 202 to get the mobility management and PDP contexts for MS 100. SGSN 202 obtains the SNDCP parameters associated with an SNDCP entity 252. The SNDCP parameters comprise at least the SNDCP compression parameters. The SGSN 202 packs the SNDCP parameters 450 to the SGSN Context Response message. In one embodiment of the invention, the SNDCP parameters are packet to the private extension information element, which may be included in any GPRS Tunneling Protocol (GTP) signaling message. The GTP and the private extension information element are defined in the 3GPP specification 29.060. The format of the SNDCP parameters carried in the private extension information element is the same as is used in XID negotiation procedure. The format is defined in the 3GPP specification 44.065, which defines the SNDCP protocol layer in GPRS. Thereupon, SGSN 202 responds with the SGSN Context Response message illustrated with arrow 403. SGSN 204 takes the SNDCP parameters and provides them to SNDCP entity 254. The SGSN Context Response message provides also the mobility management context and at least one PDP context associated with MS 100.

At step 504 SGSN 204 starts performing the XID Reset procedure. SNDCP entity 254 requests the XID Reset procedure from the LLC entity associated with Service Access Point Identifier 1 using a primitive LLGMM-RESET. Thereupon, the LLC entity forms an XID Command frame, provides it with the XID Reset parameter and IOV-UI parameter. The LLC entity sends the XID Command to the peer LLC entity as illustrated with arrow 404. The peer LLC entity resets all other SAPIs and default values are taken into use.

The peer LLC entity in MS 100 prepares and sends an XID Response message to SGSN 204 as illustrated with arrow 405. LLC entity in SGSN 204 responds with LLGMM-RESET-CNF primitive to SNDCP entity 254, which verifies that a successful XID negotiation of Reset and IOV-UI has been made.

After having received the SGSN 204 address from SGSN Context Request message, SGSN 202 may start forwarding packets to it as illustrated with arrow 406. SGSN 204 must update PDP contexts in the GGSNs that have PDP contexts active for MS 100. The updating of PDP contexts specifies, for example, the new SGSN address for the GGSNs. SGSN 204 sends the Update PDP Context Request message to GGSN 200 and receives Update PDP Context Response message as acknowledgement, as illustrated with arrows 407 and 408, respectively. The routing area update is acknowledged with Routing Area Update Accept message sent by SGSN 204 to MS 100 as illustrated with arrow 409.

At step 506 SGSN 204 waits for Routing Area Update Complete message to SGSN 204, as illustrated with arrow 410.

At step 508 the layer-3 parameters associated with at least each logical link connection carrying user plane data are re-negotiated. The re-negotiation of connections comprises, for example, the re-establishment of ABM modes for connections between peer LLC entities that were in ABM mode before the XID-reset, and XID-negotiation between peer LLC entities that were in Asynchronous Disconnected Mode (ADM) before the XID-reset. For example, at step 508 SNDCP entity 254 of FIG. 4 in SGSN 204 requests all LLC entities that were in ABM mode before the XID-reset to re-establish ABM mode. In the case illustrated in FIG. 4 in SGSN 204 there is one LLC entity for which ABM mode must be re-established. The SNDCP entity requests ABM mode establishment using LL-ESTABLISH-REQ primitive, which provides the SNDCP parameters in turn comprising the compression parameters. In FIG. 4 the LLC entity in SGSN 204 sends an SABM message as illustrated with arrow 411. The SABM message comprises XID parameters. The XID parameters comprise the SNDCP parameters 450 as layer-3 parameters. The XID negotiation is performed as part of the ABM mode re-establishment. The received layer-3 parameters are sent by the LLC entity in MS 100 to the SNDCP entity 230 in MS 100. SNDCP entity 230 may change some of the SNDCP parameters to better suit its requirements while MS 100 uses the new cell. For example, MS 100 may decide to change at least one compression algorithm and its compression parameters to suit better the data transfer rates available in the new cell. SNDCP entity 230 provides the changed SNDCP parameters to LLC entity in MS 100, which responds with an Unnumbered Acknowledgement (UA) message that comprises SNDCP parameters 451 changed by SNDCP entity 230 as XID parameters. The UA message sent from MS 100 to SGSN 204 is illustrated with arrow 412. Received SNDCP parameters 451 are provided by the LLC entity in SGSN 204 to SNDCP entity 254.

XID-negotiation between peer LLC entities that were in Asynchronous Disconnected Mode (ADM) before the XID-reset involves the exchange of XID Command and XID Response messages, which carry the XID-parameters, for example, the SNDCP parameters.

After the negotiation is successful, at step 510 the SNDCP entities in MS 100 and SGSN 204 may start transmitting packets over the logical link connections that have re-negotiated there SNDCP parameters.

In one embodiment of the invention, the SNDCP parameters are also sent during handover processing, when a real-time packet stream must be transmitted to a mobile station via a new SGSN, which serves a cell to which the mobile station is performing handover from an old cell. In that case the SNDCP parameters are sent, for example, in association with handover request message that is sent from the old SGSN to the new SGSN. Thereupon, the SNDCP parameters are provided to the mobile station.

Figure 6:
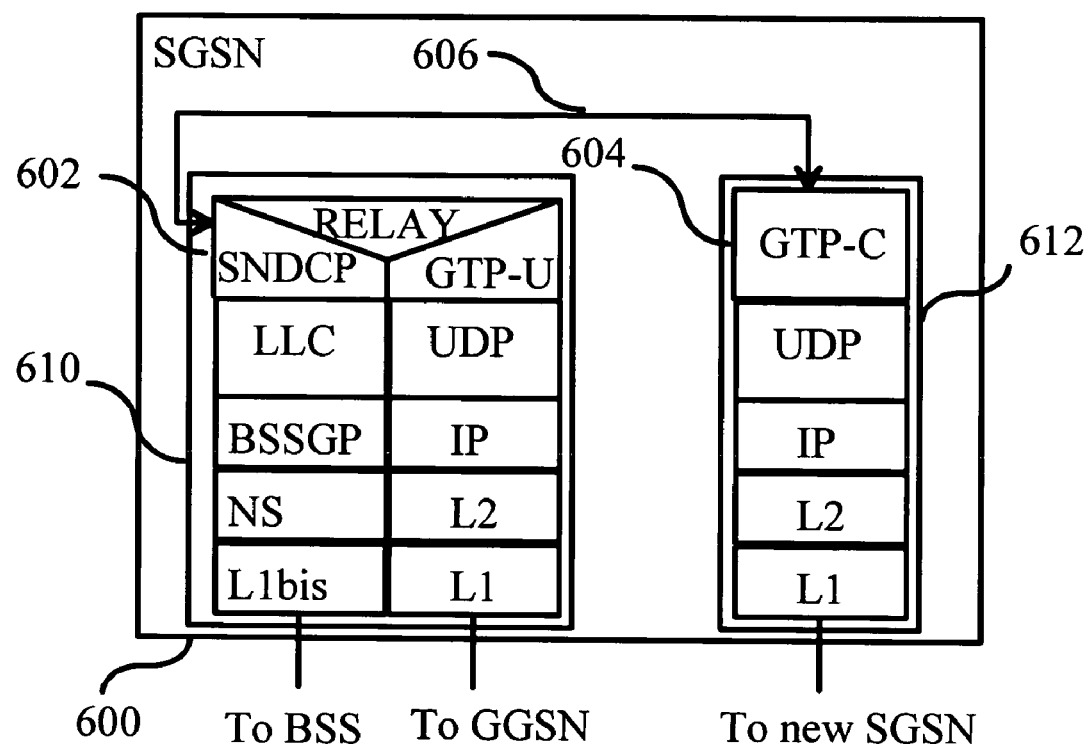
FIG. 6 is a block diagram depicting the architecture of a Serving GPRS Support Node in one embodiment of the invention.

FIG. 6 is a block diagram depicting the architecture of a Serving GPRS Support Node (SGSN) in one embodiment of the invention. In FIG. 6 there is an SGSN 600. SGSN 600 comprises a user plane protocol stack pair 610. Protocol stack pair 610 comprises a protocol stack for communicating over the Gb-interface, a protocol stack for communicating with a GGSN, and a relay function for relaying packets between the two protocol stacks. SGSN 600 comprises also a protocol stack 612 for communicating with another SGSN. Protocol stack 612 is a GPRS Tunneling Protocol (GTP) stack for control plane. When receiving an SGSN Context Request message from another SGSN, a GTP-C protocol entity 604 is configured to request the SNDCP parameters from an SNDCP entity 602. Upon receiving the request from GTP-C protocol entity 604, SNDCP entity 602 is configured to collect information held at SNDCP entity 602 that is associated with the mobile station pointed to using the TLLI that was obtained in the SGSN Context Request message. The SNDCP parameters comprise at least the SNDCP compression parameters pertaining to compression entities, together with the algorithm and parameters for each compression entity. SNDCP entity 602 is configured to respond to the request and to provide the SNDCP parameters to GTP-C protocol entity 604 In one embodiment of the invention, GTP-C protocol entity 604 is configured to return SNDCP compression parameter default values that are always used at the SGSN without separately consulting SNDCP entity 602. The providing of information from SNDCP entity 602 to GTP-C protocol entity 604 is illustrated in FIG. 6 with arrow 606.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A method, comprising:
   informing a second packet switching node of an entry of a mobile node into an area controlled by said second packet switching node;
   receiving a context request message from said second packet switching node by a first packet switching node;
   in response to said context request message, obtaining in said first packet switching node at least one compression parameter from a user plane protocol entity to a signaling plane protocol entity;
   receiving the at least one compression parameter from said first packet switching node by said second packet switching node; and
   informing said mobile node, by said second packet switching node, of the at least one compression parameter by way of layer-3 parameter renegotiation for a logical link connection.

2. The method according to claim 1, the method further comprising:
   detecting, by said mobile node, the entry of the mobile node into a cell belonging to a new area;
   informing, by said mobile node, a base station subsystem of the entry of the mobile node into said new area; and
   requesting, by said second packet switching node, information on said mobile node from said first packet switching node.

3. The method according to claim 1, wherein said first and second packet switching nodes comprise Serving GPRS Support Nodes (SGSN) of a General Packet Radio Service (GPRS) mobile communication network and said logical link connection comprises a GPRS Logical Link Control (LLC) connection.

4. The method according to claim 3, wherein the informing of said second packet switching node of the entry of said mobile node into an area controlled by said second packet switching node comprises sending a routing area update message from said mobile node to said second packet switching node.

5. The method according to claim 3, wherein said at least one compression parameter comprises information on compression entities, algorithms used by said compression entities and state information associated with said compression entities.

6. The method according to claim 1, wherein the informing of said second packet switching node of the entry of said mobile node into an area controlled by said second packet switching node comprises sending a handover preparation request message from said first packet switching node to said second packet switching node.

7. The method according to claim 1, wherein said layer-3 parameter renegotiation comprises exchange identification negotiation.

8. A mobile communication system, comprising:
   a mobile node configured to inform a second packet switching node of an entry of said mobile node into an area controlled by said second packet switching node;
   a first packet switching node configured to receive a context request message from said second packet switching node by a first packet switching node, and in response to said context request message, the first packet switching node is configured to obtain at least one compression parameter from a user plane protocol entity to a signaling plane protocol entity, wherein
   said second packet switching node is configured to receive at least one compression parameter from said first packet switching node and to inform said mobile node of the at least one compression parameter by way of layer-3 parameter negotiation for a logical link connection.

9. The mobile communication system according to claim 8, wherein
   the mobile node is further configured to detect the entry of the mobile node into a cell belonging to a new area, to inform a base station subsystem of the entry of the mobile node into said new area, and
   said second packet switching node is further configured to request information on said mobile node from said first packet switching node.

10. The mobile communication system according to claim 8, wherein said mobile communication network comprises a General Packet Radio Service (GPRS) network, said first and second packet switching nodes comprise Serving GPRS Support Nodes (SGSN) and said logical link connection comprises a GPRS Logical Link Control (LLC) connection.

11. The mobile communication system according to claim 10, wherein said mobile node informs said second packet switching node of the entry of said mobile node into an area controlled by said second packet switching node by sending a routing area update message from said mobile node to said second packet switching node.

12. The mobile communication system according to claim 11, wherein said at least one compression parameter comprises information on compression entities, algorithms used by said compression entities and state information associated with said compression entities.

13. The mobile communication system according to claim 8, wherein said mobile node informs said second packet switching node of the entry of said mobile node into an area controlled by said second packet switching node by sending a handover preparation request message from said first packet switching node to said second packet switching node.

14. The mobile communication system according to claim 8, wherein said layer-3 parameter renegotiation comprises exchange identification negotiation.

15. A packet switching node, comprising:
   a signaling plane protocol entity; and a user plane protocol entity configured to negotiate compression parameters with a mobile node to provide at least one compression parameter to the signaling plane protocol entity, wherein the signaling plane protocol entity is configured to receive an indication of said mobile node entering a new area, to request compression information from said user plane protocol entity, to receive said at least one compression parameter from said user plane protocol entity in response to the request, and to transmit said at least one compression parameter to a second packet switching node.

16. A packet switching node, comprising:

a user plane protocol entity configured to inform a mobile node of at least one compression parameter by way of layer-3 parameter renegotiation for a logical link connection; and a signaling plane protocol entity configured to receive an indication of said mobile node entering an area controlled by said packet switching node, to request information on said mobile node from a second packet switching node, to receive in response to the request said at least one compression parameter, and to provide said at least one compression parameter to said user plane protocol entity.

17. A computer program embodied on a computer readable storage medium, the computer program configured to control a processor to execute a process, the process comprising:

informing a second packet switching node of an entry of a mobile node into an area controlled by said second packet switching node;

receiving a context request message from said second packet switching node by a first racket switching node;

in response to said context request message, obtaining in said first packet switching node at least one compression parameter from a user plan protocol entity to a signaling plane protocol entity;

receiving the at least one compression parameter from said first packet switching node by said second packet switching node; and informing said mobile node, by said second packet switching node, of the at least one compression parameter by way of layer-3 parameter renegotiation for a logical link connection.

18. The computer program according to claim 17, wherein said computer readable medium comprises a removable memory card.

19. The computer program according to claim 17, wherein said computer readable medium comprises a magnetic or an optical disk.

20. An apparatus, comprising:

a processor configured to receive information of an entry of a mobile node into an area controlled by said apparatus, receive a context request message, in response to said context request message, obtain at least one compression parameter from a sub-network dependent convergence protocol entity to a signaling protocol entity, receive the at least one compression parameter, and inform said mobile node of the at least one compression parameter by way of layer-3 parameter renegotiation for a logical link connection.

* * * * *